(12) United States Patent
Hunt et al.

(10) Patent No.: US 11,268,305 B2
(45) Date of Patent: Mar. 8, 2022

(54) LATCHING SYSTEM FOR A MOTOR VEHICLE

(71) Applicant: Kiekert AG, Heiligenhaus (DE)

(72) Inventors: Robert J. Hunt, Davisburg, MI (US); Robert S. Pettengill, Farmington, MI (US); David Keehn, Brighton, MI (US); Keon Seok Bang, Farmington Hills, MI (US)

(73) Assignee: Kiekert AG, Heiligenhaus (DE)

( * ) Notice: Subject to any disclaimer, the term of this patent is extended or adjusted under 35 U.S.C. 154(b) by 932 days.

(21) Appl. No.: 15/982,119

(22) Filed: May 17, 2018

(65) Prior Publication Data

US 2019/0352945 A1 Nov. 21, 2019

(51) Int. Cl.
*E05B 79/20* (2014.01)

(52) U.S. Cl.
CPC .................... *E05B 79/20* (2013.01)

(58) Field of Classification Search
CPC .......... E05B 77/22; E05B 77/46; E05B 79/08; E05B 79/12; E05B 79/20; E05B 79/22; E05B 81/16; B62D 33/037; Y10T 292/1045; Y10T 292/108; Y10S 292/03; Y10S 292/23; Y10S 292/29
See application file for complete search history.

(56) References Cited

U.S. PATENT DOCUMENTS

| | | | | |
|---|---|---|---|---|
| 4,334,704 A | * | 6/1982 | Yamada | E05B 79/12 292/216 |
| 4,492,395 A | * | 1/1985 | Yamada | E05B 77/265 292/216 |
| 5,921,594 A | * | 7/1999 | Bendel | E05B 77/26 292/216 |
| 6,367,296 B1 | * | 4/2002 | Dupont | E05B 81/16 292/201 |
| 6,722,714 B2 | * | 4/2004 | Ooe | E05B 81/06 292/216 |
| 6,848,737 B2 | | 2/2005 | Mikolai et al. | |
| 6,913,309 B2 | | 7/2005 | Mikolai et al. | |
| 6,986,534 B2 | * | 1/2006 | Fisher | E05B 77/26 292/216 |
| 9,656,697 B2 | | 5/2017 | Puscas et al. | |
| 2008/0143124 A1 | | 6/2008 | Watson et al. | |
| 2017/0072848 A1 | * | 3/2017 | Salter | G02B 6/0003 |

FOREIGN PATENT DOCUMENTS

GB      2313150 A * 11/1997 ........... E05B 77/265

* cited by examiner

*Primary Examiner* — Christine M Mills
*Assistant Examiner* — Yahya Sidky
(74) *Attorney, Agent, or Firm* — Renner, Otto, Boisselle & Sklar, LLP

(57) ABSTRACT

A latching system for a door or flap of a motor vehicle includes a triggering lever and an operating lever to rotate the triggering lever, the triggering lever having two connections for simultaneous triggering of two separate latching devices for a door or flap, and further includes a coupling lever rotatably attached to the triggering lever to couple the operating lever with the triggering lever. Highly reliable bolting can be attained with simultaneously low manufacturing costs.

16 Claims, 3 Drawing Sheets

LATCHING SYSTEM FOR A MOTOR VEHICLE

Figure 1:
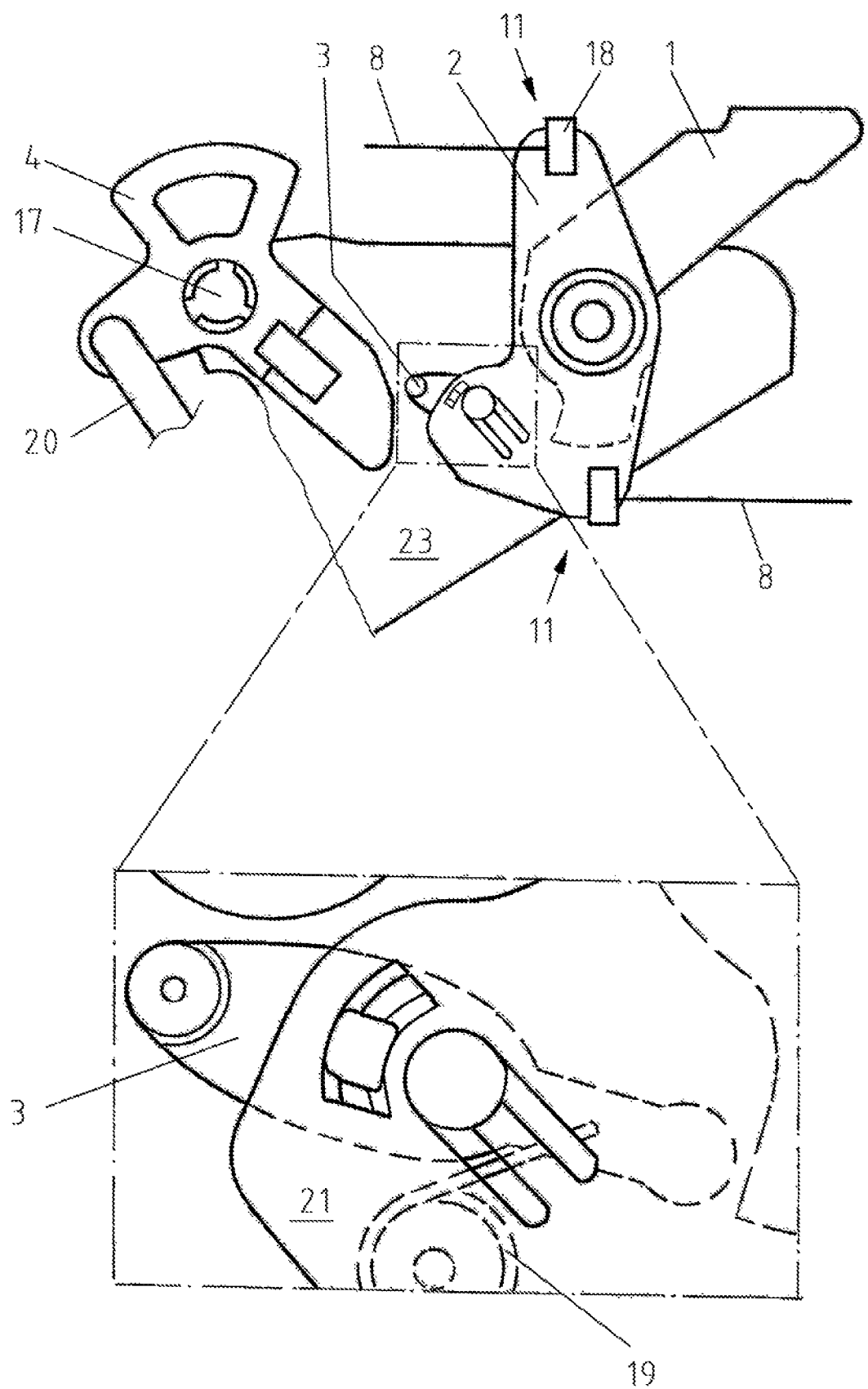

The invention relates to a latching system for a door or flap of a motor vehicle, comprising a triggering lever and an operating lever for rotating the triggering lever. The triggering lever has two connections for the simultaneous triggering of two separate latching devices for a door or a flap.

A triggering lever for the simultaneous triggering of two separate latching devices is frequently used on a latching system for a tailgate of a pick-up truck. In that case, latching devices, usually with a latch bolt, are arranged on the left and right side of the tailgate. The triggering lever is usually located in the center of the tailgate in a central arrangement, also called a 'brainplate'. A folding handle or an opening aid is utilized to pivot the operating lever, which in turn rotates the triggering lever. Connections for each of the latching devices are usually arranged at two opposite ends of the triggering lever in order to use the rotational movement, via transmission means, for the simultaneous opening of both latching devices. Such latching systems with a triggering lever are described, for example, in U.S. Pat. Nos. 9,656, 697B2, 6,913,309B2, 6,848,737B2 and US2008143124A1.

The invention aims to provide a latching system developed further, in particular having advanced functionality and simultaneously low manufacturing costs.

This aim is achieved by a latching system according to the main claim, while advantageous embodiments are described in the sub-claims.

A latching system for a door or a flap of a motor vehicle according to the invention comprises a triggering lever and an operating lever to rotate the triggering lever. The triggering lever has two connections for the simultaneous triggering of two separate latching devices for a door or a flap. A coupling lever for coupling of the operating lever with the triggering lever is pivotably attached to the triggering lever.

By means of the provision of the coupling lever pivotably attached to the triggering lever to couple the operating lever with the triggering lever, an advanced functionality, e.g. an especially reliable bolting can be enabled with simultaneously low manufacturing costs, which will be further explained in the following.

"Separate latching devices" is to be understood to mean latching devices spaced apart from each other, each with their own locking mechanism for keeping a door or flap closed. A latching device can be connected to one of the connections of the triggering lever by means of a movement transmitter, e.g. a cable or a Bowden cable. Rotation of the triggering lever as a result of operation of the operating lever can then lead to movement of a locking mechanism component of the latching device in order to open the latching device. In one design, the latching device has a spring-pretensioned latch bolt as a locking mechanism component which keeps a door or flap closed in the closed state of the latching device. The latch bolt can be pulled in against spring force by means of rotation of the triggering lever and the door or flap can thus be released. The door or flap is then no longer be held by the latch bolt and can be opened accordingly. In an alternative or complementary design, the locking mechanism of the latching device comprises a catch and a pawl as locking mechanism components, whereby the pawl can ratchet with the catch in a closed position in order to maintain a locking bolt of the door or flap in the closed state. Rotation of the triggering lever can then release the pawl from the catch so that the locking bolt can be released and the door or flap can be opened.

In particular, two latching devices can be opened simultaneously as described above. The two latching devices are preferably arranged on two opposite sides of a door or a flap. The operating lever and the triggering lever are preferably centrally arranged on the door or flap and/or centrally between the two latching devices. In the exemplary embodiment described in further detail, the latching system is used in a pick-up truck, but the latching system according to the invention can be used for doors and flaps of every kind of motor vehicle.

In one embodiment, the coupling lever can be pivoted into a bolting position to bolt the latching system. Especially simple bolting with a few components can thus be enabled and the manufacturing cost reduced. In combination with the pivotable attachment of the coupling lever on the triggering lever, a double safety function can also be attained which will be described in greater detail below.

Bolting means that the latching system is transferred into a state where operation of the operating lever does not lead to opening of the door or flap. In particular, when the coupling lever is in the bolting position, the triggering lever is not rotated by operating the operating lever. In the unbolted state of the latching system, in contrast, operation of the operating lever leads to rotation of the triggering lever and thus to opening of a latching device. The coupling lever is then not located in the bolting position.

In one embodiment, the operating lever, the coupling lever and the triggering lever are set up in such a way that when the coupling lever is located in the bolting position the operating lever is uncoupled from the triggering lever. The coupling lever therefore uncouples the operating lever from the triggering lever in the bolting position. In the proposed operation, the coupling lever can thus not transmit a movement of the operating lever on the triggering lever to release a latching device in the bolting position. Especially reliable bolting can thus be enabled.

In one embodiment, the operating lever and the coupling lever are set up in such a way that when the coupling lever is located in the bolting position, operation of the operating lever leads to a redundant movement of the operating lever. An especially simple and reliable bolting mechanism can thus be retained. A redundant movement means that although the operating lever is moved by operation, this movement does not lead to rotation of the triggering lever to trigger a latching device. In particular, the redundant movement is identical to the movement for triggering of a latching device when the coupling lever is not located in the bolting position. The triggering lever preferably does not rotate during a redundant movement of the operating lever. The coupling lever is preferably not moved by movement of the operating lever during the redundant movement. In one design, the operating lever does not come into contact with the coupling lever to rotate the coupling lever when the coupling lever is located in the bolting position and the operating lever is operated.

In one embodiment, a bolting lever is provided for to bolt the latching system. By provision of a bolting lever, manual and/or automatic bolting can be converted particularly easily, in particular by a solely central arrangement. In one design, a setting device with an electromotor is provided for automatic bolting, i.e. movement of the bolting lever into a bolting position. In particular, the bolting lever is rotatable and/or can be rotated into the bolting position.

In one embodiment, the bolting lever can rotate the coupling lever into the bolting position to bolt the latching system. An especially reliable bolting mechanism can thus be achieved. The coupling lever is located in the bolting position in the bolting position of the bolting lever.

In one embodiment, the bolting lever has a stop point for the triggering lever. Triggering of the latching device can thus be prevented and consequently a double safety function can be achieved. If, for example, the triggering lever is rotated due to a malfunction of the operating lever, despite the coupling lever being in the bolting position, the triggering lever impacts against the stop point and can thus not open a latching device by rotation. Such a malfunction can be the consequence of wear, soiling or deformation by an accident. The operating lever can come into direct, torque-transmitting contact with the triggering lever in the case of such a malfunction.

Triggering means release, i.e. releasing a locking mechanism of a latching device so that a door or flap can no longer be kept closed by means of this latching device In one embodiment, the bolting lever is located in a movement track of the triggering lever to trigger a latching device when the bolting lever is located in a bolting position. The movement track of the triggering lever for the triggering of a latching device is given by the area through which the triggering lever moves during its rotation when the operating lever is operated, when the latching system is in the unbolted state. However, if due to a malfunction the triggering lever is rotated by the operating lever, despite the coupling lever being located in the bolting position and the latching system thus being in the bolted state, the triggering lever could nevertheless trigger an opening of a latching device in an unscheduled manner. To prevent such a case, however, the triggering lever is blocked by the bolting lever because the bolting lever in the bolting position is located within the movement track of the triggering lever. The triggering lever can thus not execute the rotational movement to a sufficient extent in order to trigger a latching device. The triggering lever preferably impacts against the stop point of the bolting lever.

In particular, the latching system is set up in such a way that during rotation of the triggering lever by operation of the operating lever, although the coupling lever is located in the bolting position, the coupling lever initially impacts against the bolting lever if the bolting lever is located in the bolting position. Triple protection can thus be achieved before unscheduled triggering of a latching unit, as even if the coupling lever is not capable of preventing rotation of the triggering lever due to deformation, displacement by forcing or breakage during impact of the bolting lever, the triggering lever then impacts directly against the bolting lever, in particular against the stop point.

In one embodiment, in the bolting position the bolting lever holds the coupling lever in the bolting position against the force of a coupling lever return spring. By means of the coupling lever return spring the coupling lever is rotated especially quickly back into a starting position after the bolting lever is moved out of the bolting position into an unbolting position. Erroneous alignment, damage to latching system components and a malfunction can thus be prevented especially easily, for example, if the user simultaneously bolts and operates the operating lever, e.g. by means of an operating handle.

In one embodiment, a coupling lever stop is provided for in particular on the triggering lever which defines the starting position of the coupling lever.

In one design, an operating lever return spring and/or a triggering lever return spring are provided for. In particular, both return springs are pre-tensioned in the same direction. The operating lever return spring and/or the triggering lever return spring are preferably pre-tensioned in the opposite direction for operation or triggering of a latching device.

In particular, the coupling lever return spring and the triggering lever return spring are pre-tensioned in this same direction. An especially robust latching system can thus be attained.

In one design, a housing has a ratchet contour, in particular a recess, for the bolting lever. The ratchet contour defines the bolting position in particular. The bolting lever can thus ratchet into the bolting position. A tipping spring can thus be saved, for example.

In one embodiment, the operating lever and the triggering lever have a common rotational axis and/or are pivotably accommodated on the same stud. An installation cost of the latching system can thus be reduced by requiring only one stud instead of two. The operating lever and the triggering lever can rotate in different rotation planes. Preferably, the operating lever and the triggering lever are arranged directly adjacent to one another on the stud and/or are separated by a gap. In order to enable an especially compact design, the operating lever rubs over the triggering lever during operation in the bolted state of the latching system.

In one embodiment, the triggering lever and the bolting lever can rotate in the same rotation plane and/or are arranged in the same rotation plane, in particular in a first rotation plane. An especially simple implementation of the double safety function by means of the bolting lever is thus possible without additional components to block unscheduled rotation of the triggering lever.

In one embodiment, the operating lever and the coupling lever can rotate in the same rotation plane and/or are arranged in the same rotation plane, in particular in a second rotation plane. An especially compact design which permits contacting of the coupling lever by the operating lever can thus be enabled. The first second plane is arranged in parallel to the rotation plane and at a distance from it. The first rotation plane is at a distance from the second plane in the direction of the stud.

In one embodiment, the coupling lever has a coupling end to contact the operating lever and an actuating end to contact the bolting lever. There can be a state in which the coupling lever does not touch the operating lever with the coupling end and/or does not touch the bolting lever with the actuating end. In the unbolted state of the latching system in the case of a non-operated operating lever the coupling end does not touch the operating lever and the actuating end does not touch the bolting lever. In the bolted state in the case of a non-operated operating lever the coupling end does not touch the operating lever, for example, but the actuating end touches the bolting lever. In the unbolted state, in the case of an operated operating lever the coupling end touches the operating lever but the actuating end does not touch the bolting lever.

In particular, the actuating end has a protrusion, preferably a cylindrical protrusion. The protrusion serves to contact the bolting lever, even if the bolting lever and the coupling lever are located in two different rotation planes. In particular, the coupling end has a bolt-shaped elevation in order to be able to contact the operating lever in an improved manner and to cause less wear.

The coupling lever is elongated in particular. The coupling lever preferably has the coupling end at one end and the actuating end at an opposite other end. An especially simply shaped coupling lever, which can easily be produced, can thus be utilized.

In one embodiment, the coupling lever is pivotably attached to the triggering lever by means of a snap connection. A snap connection is a form-fitting connection of a ratchet contour on a holding contour. In order to produce the snap connection, the ratchet contour and/or the holding contour are temporarily elastically deformed in order to pass an undercut area to an envisaged mounting position in which the ratchet contour or the holding contour return to the original shape and thus snap in, i.e. ratchet in. Connecting elements such as rivets can be saved by the provision of a snap connection. In particular, metallic connecting elements can be saved and noise development thus reduced. In one embodiment, the operating lever, the triggering lever, the coupling lever and/or the bolting lever are made of plastic. Noise development can thus be reduced.

In one embodiment, the operating lever, the triggering lever, the coupling lever and the bolting lever form a central arrangement, by means of which the two latching devices can be centrally bolted, unbolted and triggered. Components can thus be saved. This central arrangement is also described as a 'brainplate' as already stated.

In one embodiment, a traction mechanism, for example a Bowden cable, is connected to each of the two connections in each instance in order to connect two latching devices to the two connections. Each of the two latching devices is then coupled to one of the two connections, in particular in such a way that in the case of rotation of the triggering lever a tensile force is transmitted to at least a locking mechanism component of the two latching devices respectively, in order to trigger the latching devices, i.e. to release the respective locking mechanism so that the door or flap can be opened.

Exemplary embodiments of the invention are explained in further detail hereafter on the basis of figures. Features of the exemplary embodiments and other alternative or complementary designs described hereafter can be combined with one another individually or in combination. The scope of protection is given by the claims, and is not to understood to be restricted to the exemplary embodiments.

Figure 2:
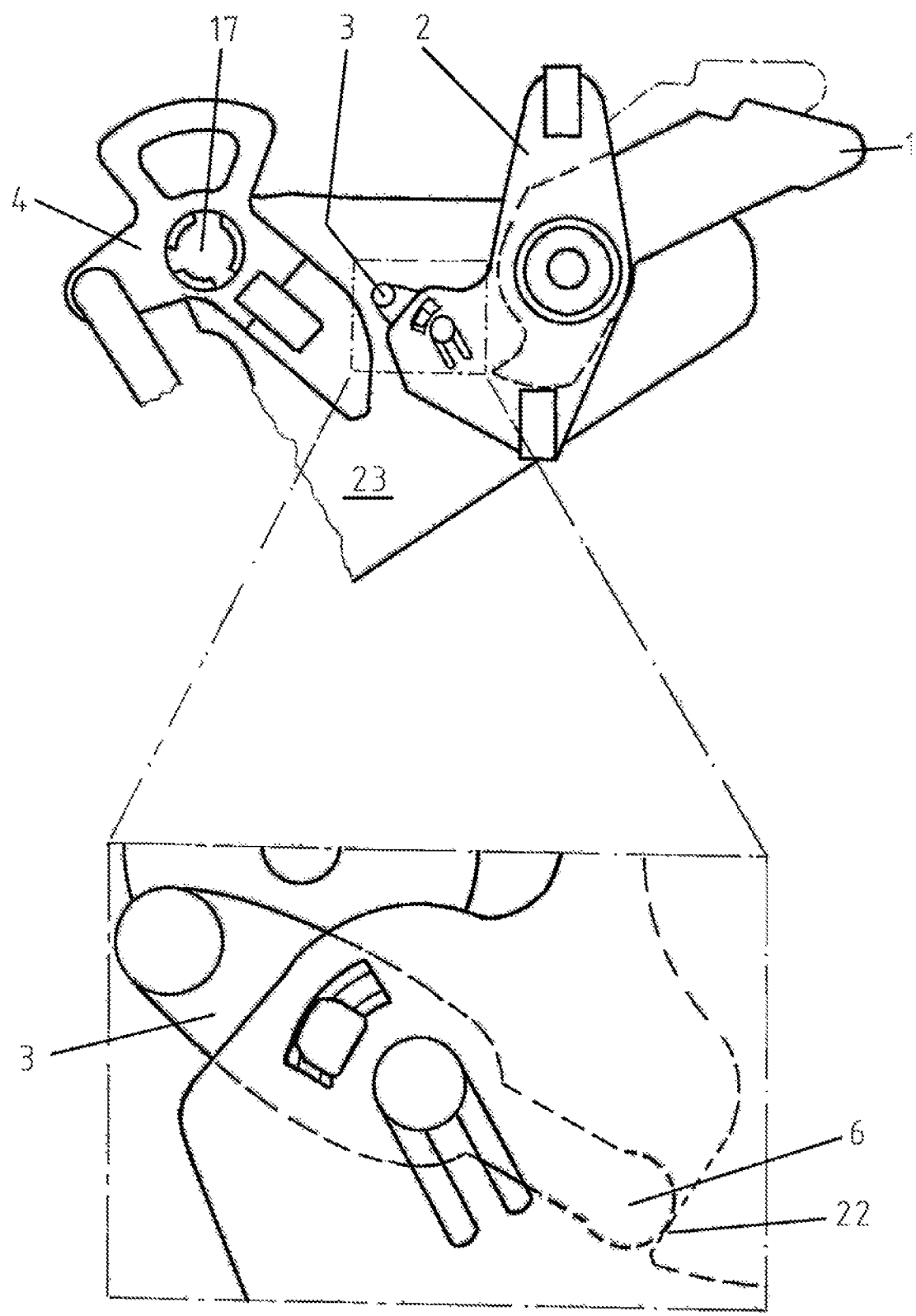
Figure 3:
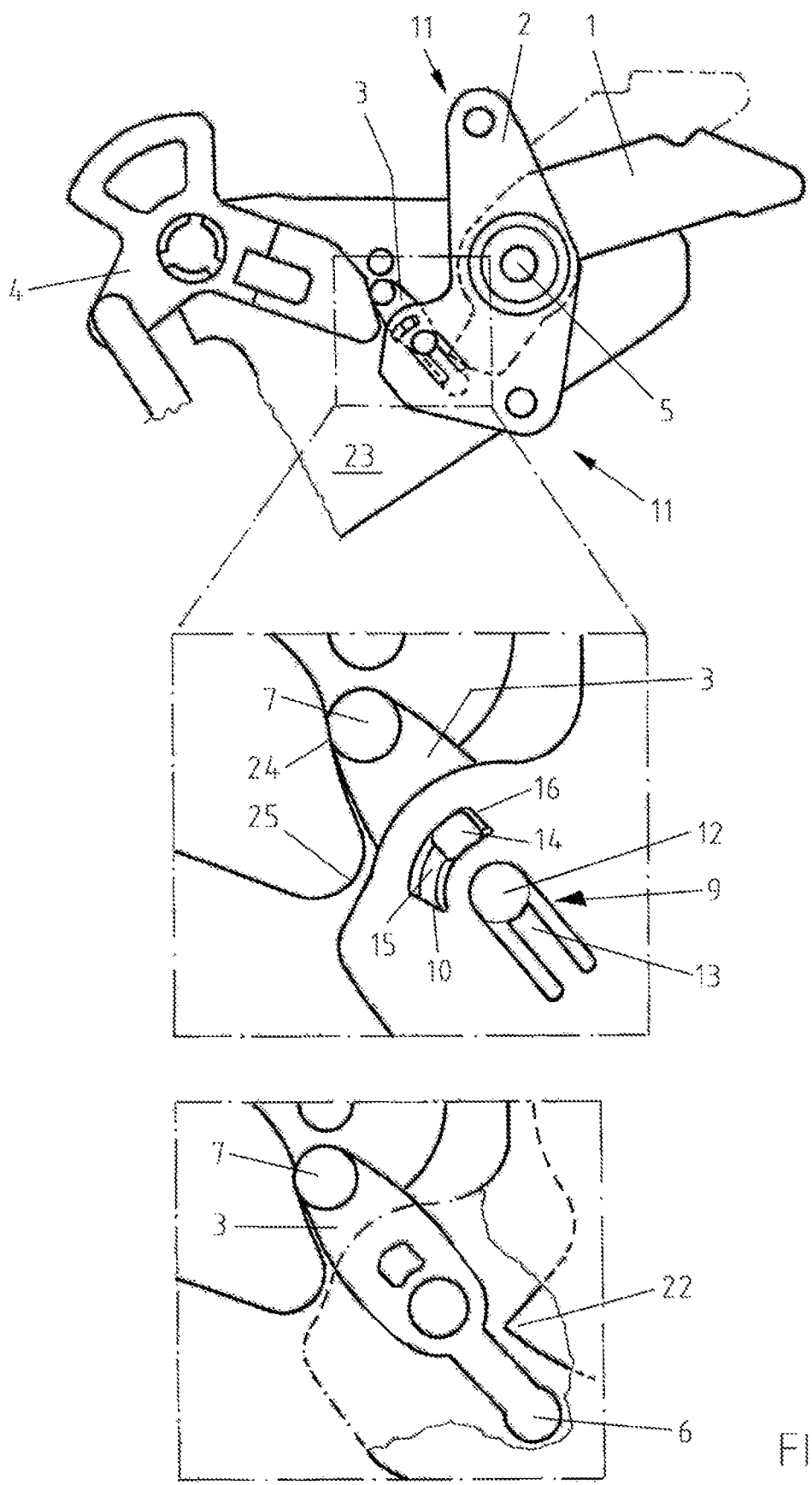

The figures show the following:

FIG. 1: A diagrammatic depiction of the operating lever, the triggering lever, the coupling lever and the bolting lever of a latching system in the unbolted state in the case of a non-operated operating lever;

FIG. 2: A diagrammatic depiction of the latching system of FIG. 1 in the unbolted state with the operated operating lever;

FIG. 3: A diagrammatic depiction of the latching system of FIG. 1 in the bolted state with the operated operating lever;

FIGS. 1 to 3 show a triggering lever 2, which in this embodiment has an elongated design, in a first rotation plane. The triggering lever 2 is pivotably attached centrally on a stud 5 and is preferably pre-tensioned in an anti-clockwise direction by a triggering lever return spring (hidden). An operating lever 1 is pivotably attached on the same stud 5 behind, in the line of view of FIG. 1, the triggering lever 2 in a second rotation plane preferably. For operation, the operating lever 1 can be pivoted in a clockwise direction, for example, by means of a mechanically connected door handle. A coupling lever 3 is also arranged in the second rotation plane and is pivotably attached to the triggering lever 2, in particular by means of a snap connection 9.

The snap connection 9 is formed by means of a ratchet contour 12 on a holding contour 13. In particular, the ratchet contour 12 is formed in a bolt shape and/or the snap connection 9 forms a pivot bearing for the coupling lever 3.

A guide element 14 of the coupling lever 3 is guided in a guide 15 of the triggering lever 2. The guide 15 is formed in particular by means of a slit and a bridge which are preferably arch-shaped so that the guide element 14 can glide along the guide 15 in the case of rotation of the coupling lever 3. The guide element 14 impacts into a direction during rotation of the coupling lever 3, in particular in an anti-clockwise direction, against the coupling lever stop 10 which thus determines the starting position of the coupling lever 3. Rotation of the coupling lever 3 is restricted by the bolting stop 16 into the opposite direction which thus defines the bolting position of the coupling lever 3.

A bolting lever 4 for bolting of the latching system is provided for in the second rotation plane. The bolting lever 4 is pivotably mounted on a pin 17. In particular, a snap connection axially fixes the bolting lever 4 on the pin 17 in order to save a fixing element.

In particular, the pin 17 and the stud 5 are formed on the housing 23 and/or always arranged above the pivot bearing of the coupling lever 3. In particular, the coupling lever 3 is always arranged between the pin 17 and the stud 5. In particular, the coupling lever 3 is always arranged between the bolting lever 4 and the operating lever 1. "Always" means the scheduled operation for the possible positions of the individual components. In its starting position, the triggering lever 2 is fundamentally vertically aligned, i.e. if the operating lever 1 is also located in its starting position or the latching system is bolted. A Bowden cable 8 is connected to the respective connection 11 on the upper and lower end of the triggering lever 2 in each instance. The connection 11 is preferably an aperture to which a clamping means 18 can be attached, by means of which the Bowden cable 8 can be clamped in turn. The Bowden cables 8 are clamped fundamentally horizontally to the fundamentally vertical triggering lever 2 and connected to lateral latching devices (not illustrated).

In particular, the triggering lever 2 has a lateral extension 21 on the underside in the direction of the bolting lever 4. Within the lateral extension 21 the coupling lever 3 is accommodated in particular centrally in relation to the coupling lever 3 and preferably in such a way that an actuating end 7 of the preferably elongated coupling lever always protrudes on the lateral extension 21 in the direction of the bolting lever 4 and/or a coupling end 6 always remains covered by the lateral extension 21.

The functionality is explained hereafter on the basis of FIGS. 1 to 3.

The latching system is depicted in FIG. 1 in the unbolted state with a non-operated operating lever 1. As shown in the enlargement in FIG. 1, the coupling end 6 does not touch the operating lever 1. The actuating end 7 also does not touch the bolting lever 4. The coupling lever 3 is located in the starting position in which the coupling lever return spring 19 presses the guide element 14 against the coupling lever stop 10.

FIG. 2 now shows operation of the operating lever 1 while the latching system is in the unbolted state. The operating lever 1 rotates in a clockwise direction and impacts with the coupling point 22 of the operating lever 1 against the coupling end 6 of the coupling lever 3. The operating lever 1 presses against the coupling lever 3 and thus tows the triggering lever 2. The triggering lever 2 thus also rotates in a clockwise direction. The two Bowden cables 8 are tensioned in response and open the latching devices. The actuating end 7 of the coupling lever 3 remains free and does not impact against the bolting lever 4. After the opening process, the triggering lever 2 is moved back into its starting position by the triggering lever return spring, in particular against a triggering lever stop preferably on the housing 23.

The operating lever 1 preferably also returns to its starting position by means of spring force following operation.

The bolting lever 4 was rotated in an anti-clockwise direction in FIG. 3 by means of the actuator 20. The actuator 20 is moved in particular by means of an actuator is controlled by a central locking system, for example. Said actuator is, in order to have a better overview, not depicted in the drawings. By means of rotation of the bolting lever 4 an actuating section 24 of the bolting lever 4 comes into contact with the actuating end 7 of the coupling lever 3 and rotates the coupling lever 3 against the coupling lever return spring 19 in a clockwise direction until the bolting lever 4 reaches the bolting position as shown in FIG. 3 and the coupling lever 3 has assumed the bolting position. The actuating end 7 preferably has a bolt-shaped protrusion parallel to the rotational axis for contacting of the actuating end 7 by means of the bolting lever 4.

If the operating lever 1 is now operated, it performs a freewheeling movement as shown in the enlarged view in FIG. 3. The coupling point 22 then passes the coupling end 6 and does not come into contact with the coupling end 6. The triggering lever 2 is thus uncoupled from the operating lever 1. The latching devices are thus not triggered and remain closed.

Hereinafter, the case of a malfunction is now described in which, for example, by means of soiling of the operating lever 1 a torque is transmitted directly to the triggering lever 2 in a clockwise direction, for example by friction on the triggering lever 2. The torque is then absorbed by the coupling lever 3 which is in the bolting position and is braced on the bolting lever 4 by means of the actuating end 7. If the torque transmitted by the operating lever 1 on the triggering lever 2 is so large that the coupling lever 3 can no longer absorb the torque, the triggering lever 2 rotates further in the clockwise direction and impacts against the stop point 25 of the bolting lever 4. The rotational movement of the triggering lever 2 is stopped by the stop point 25 before triggering of the latching devices occurs. Unscheduled triggering of the latching devices can thus be reliably prevented without additional components.

The invention claimed is:

1. A latching system for a door or flap of a motor vehicle, comprising:
   a triggering lever,
   an operating lever to rotate the triggering lever, the triggering lever having two connections for simultaneous triggering of two separate latching devices for a door or flap,
   a coupling lever rotatably attached to the triggering lever to couple the operating lever with the triggering lever during an opening process in which the operating lever presses against the coupling lever to carry the triggering lever thereby triggering the two separate latching devices, wherein the coupling lever and the operating lever are in non-contact during a non-operated state of the operating lever, and
   a bolting lever for moving the latching system into a bolted state, the bolting lever being movable to a bolting position in which the coupling lever directly contacts the bolting lever and is disengaged from the operating lever,
   wherein when in the bolting position, the bolting lever is arranged to be directly impacted by the triggering lever at a stop point formed on the bolting lever during a displacement of the triggering lever to prevent further displacement of the triggering lever and triggering of the two separate latching devices.

2. The latching system of claim 1, wherein the coupling lever is pivotable into a bolting position to bolt the latching system.

3. The latching system of claim 2, wherein, when the coupling lever is in the bolting position, the operating lever is uncoupled from the triggering lever.

4. The latching system of claim 1, wherein, when the coupling lever is in a bolting position corresponding to the bolting position of the bolting lever, operation of the operating lever leads to a freewheeling movement of the operating lever.

5. The latching system of claim 1, wherein the bolting lever can pivot the coupling lever into the bolting position to bolt the latching system.

6. The latching system of claim 1, wherein, the bolting lever is movable to a bolting position located in a movement track of the triggering lever to block the triggering lever.

7. The latching system of claim 1, further comprising a coupling lever return spring, wherein the bolting lever in a bolting position holds the coupling lever against a force of the coupling lever return spring.

8. The latching system of claim 1, wherein the operating lever and the triggering lever have a common rotational axis and/or are pivotably accommodated on a same stud.

9. The latching system of claim 1, wherein the triggering lever and the bolting lever are pivotable in a same rotation plane.

10. The latching system of claim 1, wherein the operating lever and the coupling lever are pivotable in a same rotation plane.

11. The latching system of claim 1, wherein the coupling lever has a coupling end to contact the operating lever and an actuating end to contact the bolting lever.

12. The latching system of claim 1, wherein the coupling lever is pivotably attached to the triggering lever by a snap connection.

13. The latching system of claim 1, wherein a traction system or Bowden cable is connected to each of the two connections in order to connect two latching devices to the two connections.

14. The latching system of claim 1, wherein the bolting lever and the coupling lever are in non-contact prior to actuation of the coupling lever when the latching system is in a non-bolted state.

15. The latching system of claim 1, wherein when the bolting lever is in a bolting position, a torque of the triggering lever is absorbed by the coupling lever which is engaged against the bolting lever.

16. The latching system of claim 15, wherein if the torque exceeds a predetermined amount and the triggering lever is further rotated, the triggering lever is prevented from further rotation via engagement against the bolting lever.

* * * * *